United States Patent
Ellmann

(10) Patent No.: US 7,225,845 B2
(45) Date of Patent: Jun. 5, 2007

(54) ARRANGEMENT FOR FILLING AIR INTO A ROTATING PNEUMATIC TIRE

(75) Inventor: Manfred Ellmann, Buch am Erlbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/342,819

(22) Filed: Jan. 31, 2006

(65) Prior Publication Data

US 2006/0118224 A1  Jun. 8, 2006

Related U.S. Application Data

(63) Continuation of application No. PCT/EP04/51342, filed on Jul. 2, 2004.

(30) Foreign Application Priority Data

Aug. 1, 2003  (DE) ............... 103 35 244

(51) Int. Cl.
*B60C 25/00* (2006.01)
(52) U.S. Cl. .................... 152/426; 152/419
(58) Field of Classification Search ............. 152/415, 152/418–419, 423–426
See application file for complete search history.

(56) References Cited

U.S. PATENT DOCUMENTS

| | | | |
|---|---|---|---|
| 638,628 A * | 12/1899 | Everett et al. ............ | 152/425 |
| 686,319 A | 11/1901 | Morgan | |
| 1,050,886 A * | 1/1913 | Wetherell ................. | 152/426 |
| 1,134,361 A * | 4/1915 | Wetherell ................. | 152/426 |
| 3,304,981 A * | 2/1967 | Sheppard .................. | 152/426 |
| 4,922,984 A * | 5/1990 | Dosjoub et al. ........... | 152/415 |
| 5,052,456 A * | 10/1991 | Dosjoub .................... | 152/415 |

FOREIGN PATENT DOCUMENTS

DE  3433318 A1  3/1986
DE  38 81 591 T2  9/1993

(Continued)

OTHER PUBLICATIONS

International Search Report for PCT/EP2004/051342 dated Oct. 18, 2004.

(Continued)

*Primary Examiner*—Jason R. Bellinger
(74) *Attorney, Agent, or Firm*—Crowell & Moring LLP

(57) ABSTRACT

A hose-type structure is arranged essentially between the tire and the rim, which structure is connected at the end side with the environment and, by way of a valve, with the interior of the tire. The hose-type structure fills the tire during its rotating movement, and is locally squeezed from the environment side toward the tire interior, in which case the hose-type structure is provided in the area between the tire and the rim flange. A duct is provided in the rim flange or in the tire in the area of its bead chamfer, and at least partially receives the hose-type structure in the form of a hose. The geometry of the duct and of the hose-type structure is selected such that this air-conveying squeezing essentially takes place only as long as the internal tire pressure is below a desired value.

7 Claims, 1 Drawing Sheet

FOREIGN PATENT DOCUMENTS

| | | | |
|---|---|---|---|
| DE | 43 23 835 A1 | 1/1995 | |
| GB | 1086512 | 10/1967 | |
| JP | 362173307 A  * | 7/1987 | ................ 152/418 |
| WO | WO 02/051655 A2 | 7/2002 | |
| WO | WO 03/049958 A1 | 6/2003 | |

OTHER PUBLICATIONS

International Preliminary Examination Report for PCT/EP2004/051342 dated Oct. 18, 2004.

German Search Report dated Jun. 8, 2004.

* cited by examiner

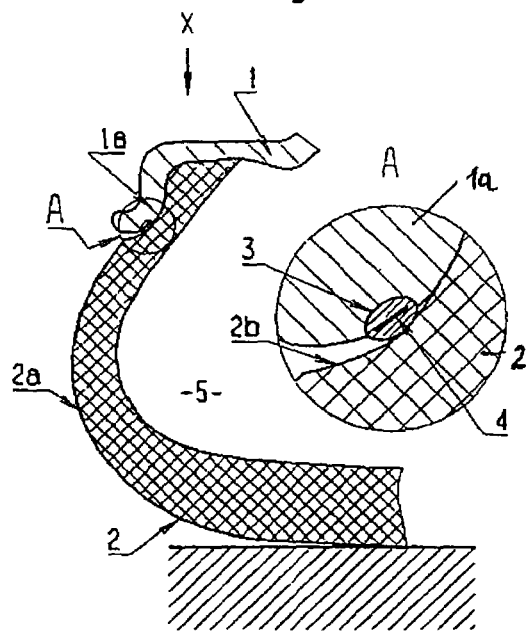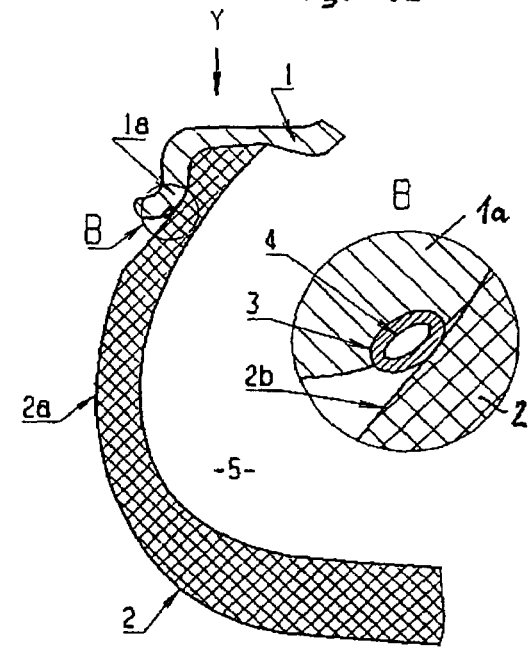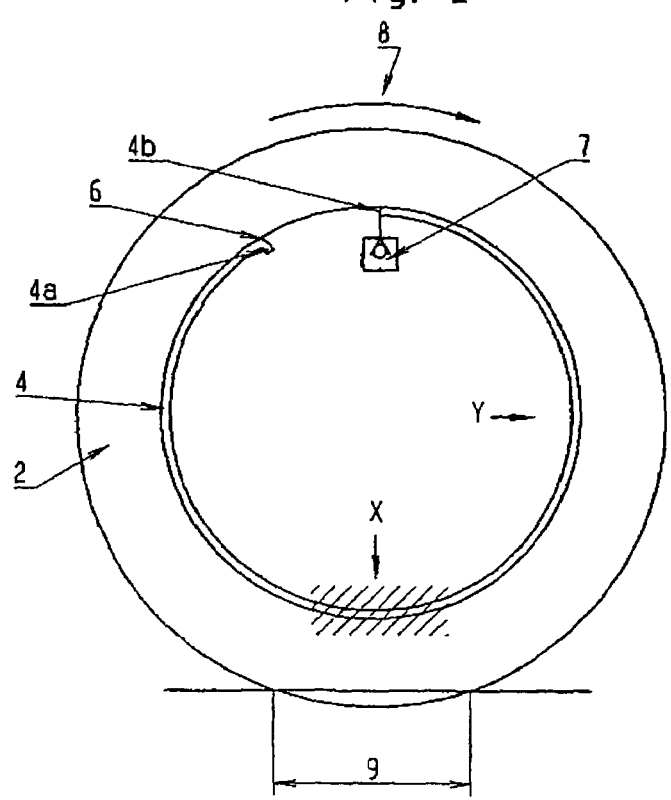

ARRANGEMENT FOR FILLING AIR INTO A ROTATING PNEUMATIC TIRE

The present application is a continuation of International Application No. PCT/EP/2004/051342, filed Jul. 2, 2004, and claims priority under 35 U.S.C. § 119 to German Application No. 103 35 244.9, filed Aug. 1, 2003. The entire contents of these documents are herein expressly incorporated by reference.

BACKGROUND AND SUMMARY OF THE INVENTION

The invention relates to an arrangement for filling air into a pneumatic tire arranged on a rim, rotating together with this rim and comprising a hose-type structure arranged essentially between the tire and the rim, which structure is connected at the end side with the environment and by way of a valve, with the interior of the tire and which, for filling the tire during its rotating movement, is locally squeezed from the environment side toward the tire interior. With respect to the technical background, reference is made to U.S. Pat. Nos. 5,052,456 and 4,922,984.

Normally, the pneumatic tires arranged on wheels of vehicles are filled, depending on the requirements, by way of a valve. An air lead-through provided in the pertaining wheel hub area is also known, which has controllable valves and a rotating air pump mounted in the wheel area, the driving torque of the air pump being generated during the wheel rotation by a mass with a center of gravity arranged in an offset manner. Furthermore, International Patent Document WO 02/051655 A2 discloses a device in the manner of an air pump which is driven by means of the self-movement of the tire bead during the rotating of the tire.

While a simple filling by way of the valve is readily neglected or forgotten, the filling by way of controllable valves requires high expenditures because of the required lines, the sensing of the wheel load and of the pressure as well as the pertaining control. Even the above-mentioned air pump constructions cause high constructional expenditures. In comparison, an arrangement according to the initially mentioned documents is simpler. In this case, a first embodiment illustrated in this document also still requires relatively high expenditures since, in this case, an independent contact pressure device is required by means of which a hose rotating together with the wheel or the tire is locally continuously squeezed, in which case this contact pressure device also should be capable of being positioned differently so that a filling of the tire is carried out only when required. In the case of a second embodiment illustrated in U.S. Pat. Nos. 5,052,456 and 4,922,984, no such contact pressure device is required. The pneumatic tire itself operates as such. However, according to this second embodiment, air can be pumped into tire only when the latter flat-spots considerably with its tire contact area; that is, now only has a very low internal pressure.

It is an object of the present invention to provide a simplified and nevertheless effective arrangement for filling a pneumatic tire.

According to the invention, a hose-type structure, which operates as an air pump as a result of locally displaced squeezing, is provided in the area of the so-called rim flange of the rim carrying the tire. When the geometrical design or the arrangement is suitable, it can be ensured in this area in a simple manner that a rotating tire with an internal pressure which is too low in the continuously moving-along contact area, (i.e., the circumferential section in each case representing the tire contact surface), continuously squeezes the hose-type structure such that, through this hose-type structure, as desired, air is conveyed or pumped into the tire interior from an intake section connected with the environment. Because of the tire deformation taking place when the interior tire pressure is too low, this takes place in the tire side wall area adjacent to the rim flange or in the bead chamfer bulge of the tire. In this case, a corresponding tire deformation occurs already when the internal tire pressure is only to a relatively small degree below the normal desired pressure value. If, in contrast, the internal tire pressure is in the range of the desired value or above, normally no correspondingly intensive tire deformation takes place, and—as desired—no additional air is then transported through the hose-type structure into the tire interior.

As far as the constructive design is concerned, the hose-type structure can be arranged in a duct, so that its position can be defined and maintained in a best possible manner. Thus, a duct can be provided in the rim flange, which duct at least partially receives the hose-type structure in the form of a hose. This hose is then squeezed while the wheel or tire rotates because of its contact area in a locally continuous manner by the section of the lateral tire wall close to the rim or by its so-called bead chamfer. As an alternative, a duct can be provided in the tire itself in the area of its bead chamfer, which duct at least partially receives the hose-type structure in the form of a hose. Then the squeezing force of the rotating rim flange is applied to the hose which, in the case of this arrangement, is also essentially pressed against the rim flange only in the respective contact section of the tire. Another embodiment of the present invention operates in a similar manner, in which a hollow duct is shaped in the tire itself in the area of its bead or bead chamfer, which hollow duct forms a hose-type structure and describes a closed cross-section. This hollow duct can be produced during the manufacturing of the tire, for example, by using the "non-permanent mold principle" from the casting practice or by the installation of a wire-shaped preform which can be pulled out after the heating process.

In principle, it is recommended that the geometry of the duct and of the hose-type structure or of the hollow duct forming the latter be selected such, and the additional elements participating in filling air into a tire by a local squeezing of the hose-type structure be designed such that this air-conveying squeezing takes place essentially only as long as the internal tire pressure is below a desired value required for the respective current wheel load. The process described above, in which, while the tire is rotating, the hose-type structure or the hose is locally squeezed having a displacing effect from the environment side toward the tire interior, will then take place only until the internal tire pressure has reached its desired value, after which, with a given load, the radial compression of the tire and thus the strength of the side wall or bead chamfer bulge is reduced to such an extent that the hose (or the hose-type structure) is no longer to the complete internal sealing and thus loses its air sealing capability; that is, can no longer pump or convey any additional air. Thus, when the components have a corresponding design, the overall system can therefore be virtually self-governing, according to the principle of a "high-pressure self-governed compressor".

As mentioned above, by means of the hose-type structure, air can be conveyed from the environment into the tire interior by means of a locally displaced squeezing of the hose-type structure, in which case a suitable valve, particularly a check valve, is provided in the transition area to the tire interior. This check valve may be a flap valve or may be formed by the conventional tire valve. In addition, the hose-type structure may be equipped with a filter, particularly a hydrophobic capillary-pore membrane filter, on the intake side toward the environment. This prevents air contaminations present in the tire area and water from being brought into the tire air or into the hose-type structure, which may cause valve leakiness, clogging, icing and corrosion or chemical attacks there.

BRIEF DESCRIPTION OF THE DRAWING FIGURES

In the following, the invention will be further explained by means of an embodiment shown only diagrammatically.

FIG. 1a is a partial sectional view of a rim with a pneumatic tire as well as with a hose-type structure according to the invention, when the tire has a squeezing effect on this structure or on the hose, as well as of an enlarged cutout A;

FIG. 1b is a corresponding representation of the geometrical conditions away from the so-called contact zone of the tire, as well as of an enlarged cutout B.

FIG. 2 is a very simplified lateral view X of FIG. 1b upon the tire with the rim and the hose-type structure.

DETAILED DESCRIPTION OF THE PREFERRED EMBODIMENTS

Reference number 1 indicates the rim of a vehicle wheel on which a tire 2 is mounted in a conventional manner. In the rim flange 1a of the rim 1, a surrounding duct 3 is provided on its surface pointing essentially in the radial direction toward the outside, in which duct 3 a hose-shaped structure 4 in the form of a hose (also reference number 4) is inserted and extends over a large portion of the circumference. The first end 4a of the hose 4 is situated in the environment, somewhere inside the rim, that is, radially within the rim well, while the second end 4b of the hose 4 by way of a check valve 7 leads finally into the tire interior or is connected with the latter. In this case, the tire 4 itself can lead into the tire interior 5 and thus radially outside the rim well. However, as an alternative, the hose 4 can also lead directly into an otherwise essentially conventional tire valve which is not shown in the figure and is provided for the regular filling of air into the tire 2. The above-mentioned check valve 7 may be an independent structural component, for example, in the form of a simple flap valve. However, the conventional tire valve may possibly also take over the function of the check valve 7. A commercially available hydrophobic capillary-pore membrane filter 6 is provided at the other first end 4a of the hose 4.

In addition to the just-described hose ends 4a, 4b with the filter 6 or the check valve 7, FIG. 2 shows the rotating direction 8 of the rotating wheel or tire 2 and, in addition, the so-called contact area 9 as that section of the tire 2 which is currently in contact with the ground and thus deforms in the known manner. During the rolling-off of the not sufficiently air-filled tire 2 on the ground, in the contact area 9 of the tire 2, its side wall 2a in the area between the contact surface and the bead chamfer 2b bulges out so far to the outside that, in the area of its bead chamfer 2b, the tire 2 continuously squeezes the hose 4 partially situated in the duct 3, as illustrated in FIG. 1a. With the rotation of the vehicle wheel or tire 2, the air volume situated in the hose 4, starting from the first end 4a, is now continuously reduced in the direction toward the second end 4b or toward the check valve 7, the internal pressure increasing in this section of the hose 4 situated between the current contact area 9 and the check valve 7. When the internal pressure in this section of the hose 4 exceeds the pressure existing in the tire interior 5, the check valve 7 opens, and the above-mentioned quantity of compressed air pressurized in the hose 4 flows into the tire 2 and increases its internal pressure.

After the passage through the contact area, the tire side wall 2a with the bead chamfer 2b returns to the initial shape according to FIG. 1b, in which the hose 4 is virtually not squeezed. As soon as the so-called contact area 9 has passed a hose section close to the first end 4a of the hose 4, so that no squeezing of the hose 4 takes place in this section, the hose 4 takes up its original round shape again, in which case new ambient air is sucked into the hose 4 by way of the filter 6. In this case, FIG. 1b not only shows the condition when the tire is essentially unloaded without contact, but a similar condition in which the hose 4 is not squeezed also occurs when the air pressure in the tire interior 5 is no lower than a desired value. Thus, as soon as, starting out from an insufficiently air-filled tire 2, the desired value of the internal tire pressure has been reached in the above described manner, automatically no additional air will be conveyed into the tire interior 5.

At a vehicle wheel with an arrangement for filling the pneumatic tire according to the invention, the pressure loss in the pneumatic tire, which is unavoidable because of diffusion, can be automatically compensated in the driving operation, whereby freedom from servicing is advantageously achieved. This reduces the servicing expenditures, the tire wear and the rolling resistance and prevents excessive power drops of steering systems, systems relating to driving dynamics, regulating and braking systems of the vehicle as a result of neglected care of the tire pressure. By means of the arrangement according to the invention, the compression in the tire, which becomes too high during a load increase of the vehicle without a simultaneous pressure increase, can advantageously be automatically reduced in the continued driving operation of the vehicle. As a result, there is no longer the danger of an unacceptably high mechanical and thermal loading of the tire, in which case, the above-mentioned desired value for the internal tire pressure is automatically adapted to an increasing loading of the tire, for example, as a result of the load increase of the vehicle. Advantageously, no high-expenditure elements for the guiding of air, for the controlling and regulating are required. In the case of the so-called run-flat tires, the so-called roll flat distance can be increased when a pressure loss as a result of tire damage can be significantly slowed down by means of the suggested arrangement. In this connection, it should be pointed out that a large number of details can be designed to deviate from the above explanations without leaving the content of the claims.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An arrangement for filling air into a pneumatic tire, the arrangement comprising:

a pneumatic tire arranged on a rim, both of which rotate together; and a hose-type structure, arranged between the tire and a rim flange of the rim, the hose-type structure includes a first side connected with the environment and a second side connected with an interior of the pneumatic tire, wherein the first and second sides are connected by a valve, and the hose-type structure is locally squeezed from the first side toward the second side during rotating movements of the tire in order to fill the tire.

2. The arrangement according to claim 1, further comprising:
 a duct provided in the rim flange, wherein the hose-type structure is partially situated in the duct.

3. The arrangement according to claim 1, wherein a hollow duct forming the hose-type structure and describing a closed cross-section is shaped into the tire in an area of its bead or bead chamfer.

4. The arrangement according to claim 1, further comprising:
 a duct provided in the tire in an area of its bead chamfer, wherein the duct at least partially receives the hose-type structure in the form of a hose.

5. The arrangement according to claim 2, wherein a geometry of the duct and of the hose-type structure is selected such, that the local squeezing takes place essentially only as long as the internal tire pressure is below a desired value.

6. The arrangement according to claim 1, wherein the hose-type structure includes a filter on the first side.

7. The arrangement according to claim 1, wherein the valve is a check valve.

\* \* \* \* \*